United States Patent
West et al.

(10) Patent No.: US 11,170,189 B1
(45) Date of Patent: Nov. 9, 2021

(54) IMAGING SYSTEM FOR IDENTIFYING MEDICATION CONTAINERS

(71) Applicant: Express Scripts Strategic Development, Inc., St. Louis, MO (US)

(72) Inventors: Edward E. West, Sewell, NJ (US); Scott Walter, Maple Shade, NJ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 17/036,651

(22) Filed: Sep. 29, 2020

(51) Int. Cl.
G06K 7/10 (2006.01)
G06K 7/14 (2006.01)

(52) U.S. Cl.
CPC ........... G06K 7/10772 (2013.01); G06K 7/14 (2013.01); *A61J 2205/10* (2013.01)

(58) Field of Classification Search
CPC .. G06K 7/10762; G06K 7/10772; G06K 7/14; A61J 2205/10; G01N 29/265; G01N 2035/00752
See application file for complete search history.

(56) References Cited

U.S. PATENT DOCUMENTS

| | | | |
|---|---|---|---|
| 5,286,959 A * | 2/1994 | Demachi | G01N 35/04 235/462.14 |
| 5,705,384 A * | 1/1998 | Berndt | C12M 23/08 356/427 |
| 6,985,870 B2 | 1/2006 | Martucci | |
| 7,444,203 B2 | 10/2008 | Rosenblum | |
| 8,219,413 B2 | 7/2012 | Martinez | |
| 8,746,550 B2 | 6/2014 | Steusloff | |
| 8,755,590 B2 | 6/2014 | Sandstrom | |
| 9,076,115 B2 | 7/2015 | Utech | |
| 9,514,131 B1 * | 12/2016 | Bochenko | G16H 20/13 |
| 9,916,715 B2 | 3/2018 | Wagner | |
| 10,073,955 B2 | 9/2018 | Ervin | |
| 10,545,048 B2 | 1/2020 | Pilkington | |
| 2005/0247790 A1 * | 11/2005 | Itoh | G01N 35/00732 235/462.01 |
| 2010/0071830 A1 | 3/2010 | Putzer | |
| 2017/0011202 A1 * | 1/2017 | Kamen | G06K 9/00255 |
| 2017/0212913 A1 | 7/2017 | Kurse | |
| 2018/0357476 A1 | 12/2018 | Klumph | |
| 2020/0103270 A1 | 4/2020 | Pilkington | |
| 2020/0256885 A1 * | 8/2020 | Wissmann | G01N 35/04 |

* cited by examiner

*Primary Examiner* — Suezu Ellis
(74) *Attorney, Agent, or Firm* — Dickinson Wright PLLC

(57) ABSTRACT

The imaging system includes a rotating element that is configured to rotate about a central axis. A plurality of scanners are fixedly attached with the rotating element. Each scanner has a lens that faces generally towards the central axis, and the scanners are spaced apart from one another around the central axis. The scanners are configured to identify an optically readable machine readable code contained on the medication container. An actuator is operably connected with the rotating element and is configured to rotate the rotating element and the scanners around the central axis from respective e first positions to respective second positions to allow the scanners to image different areas of the medication container in response to a failure of the scanners to identify the machine readable code when the scanners were in the respective first positions.

20 Claims, 8 Drawing Sheets

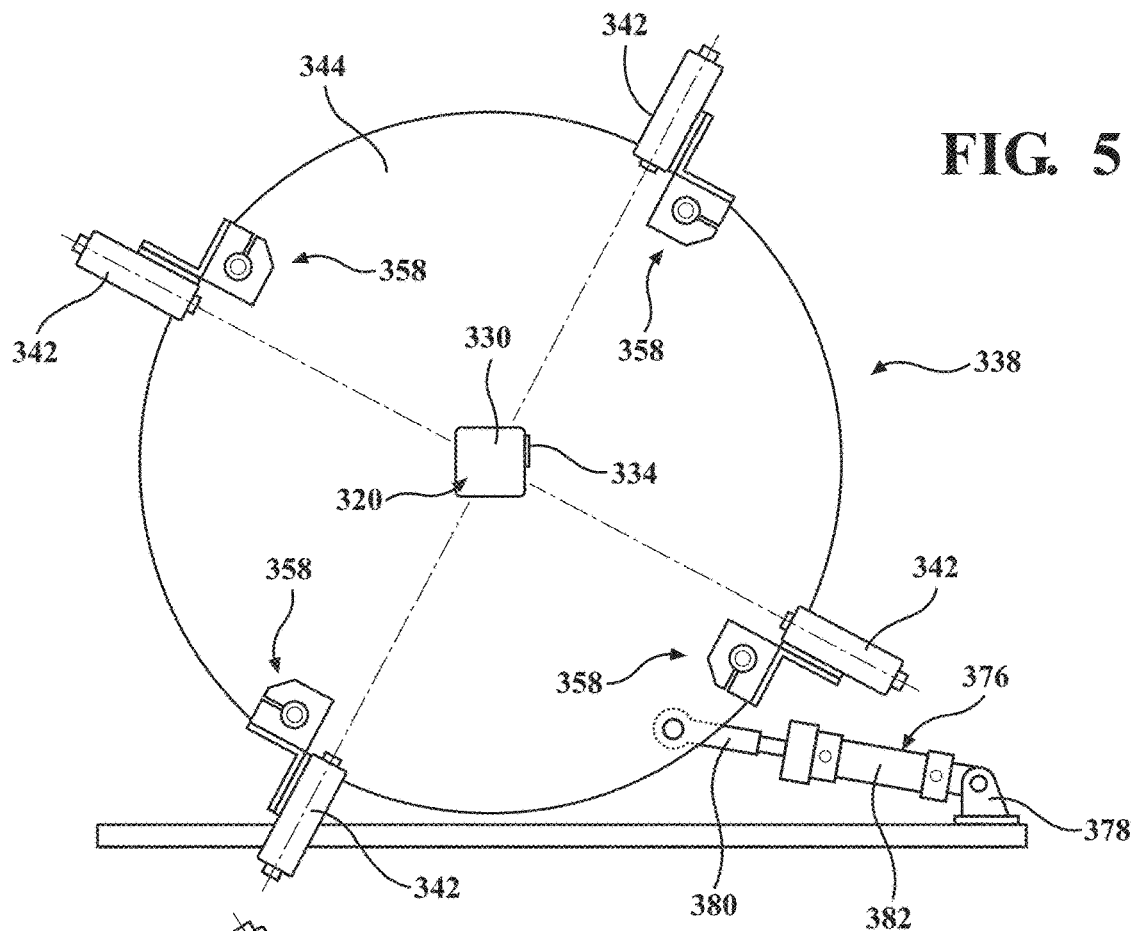
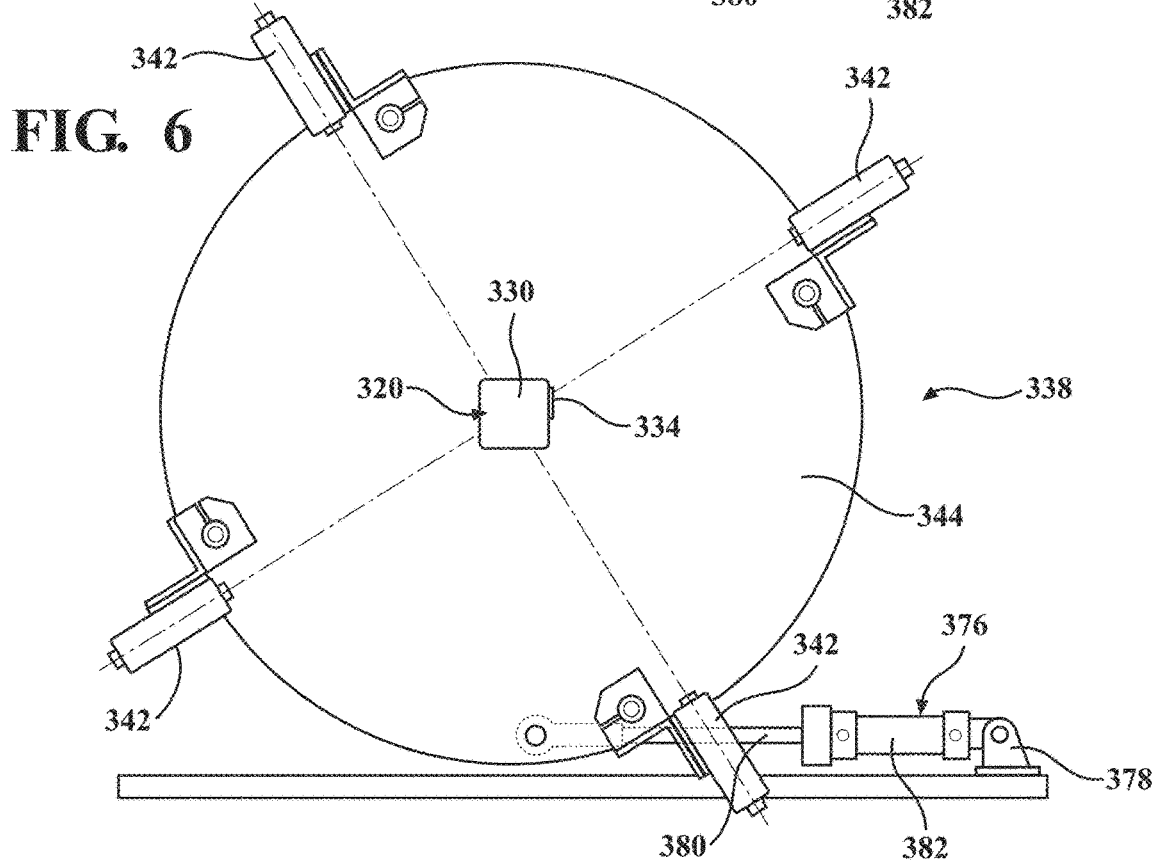

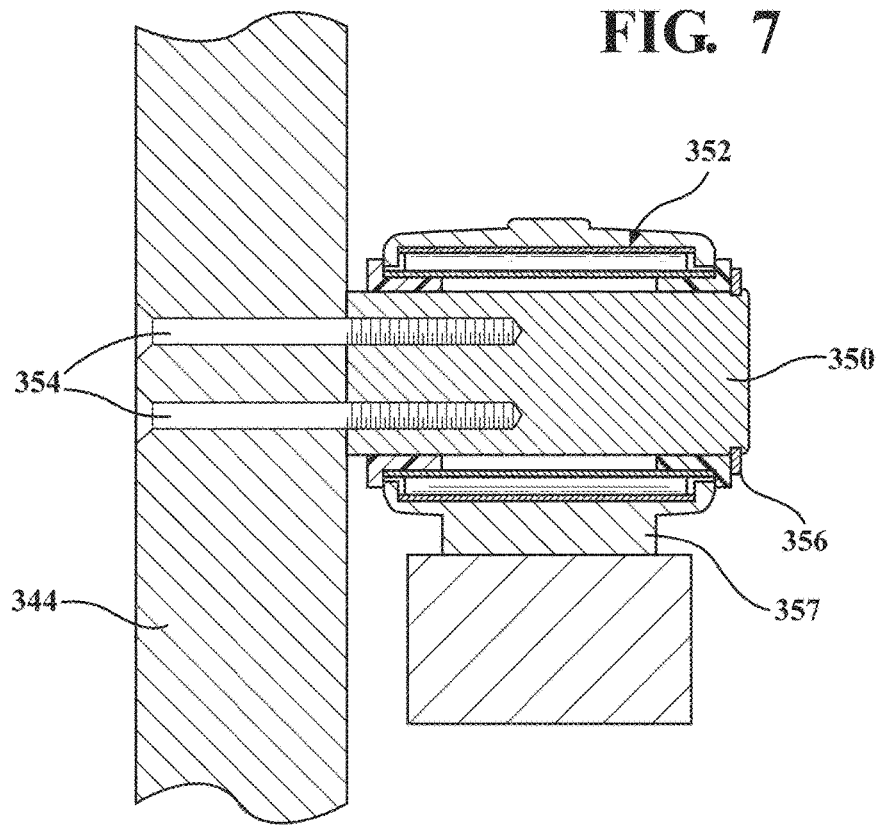
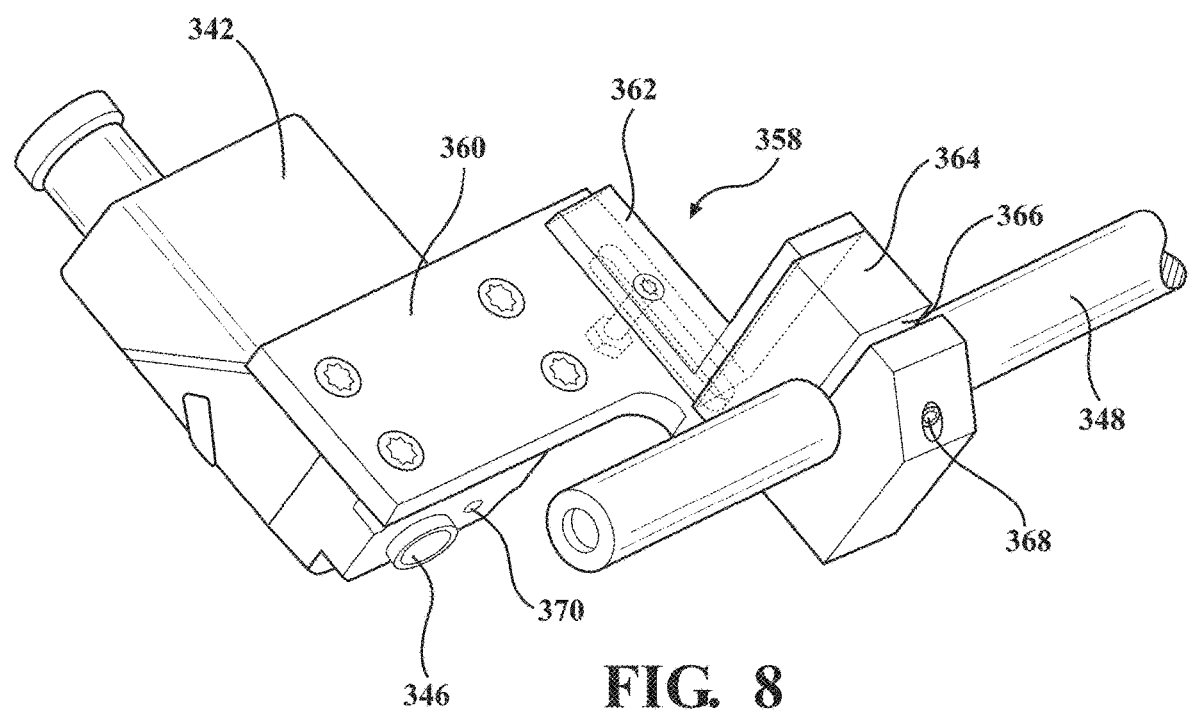

IMAGING SYSTEM FOR IDENTIFYING MEDICATION CONTAINERS

BACKGROUND OF THE INVENTION

1. Field of the Invention

The present invention is related generally to high volume filling center, e.g., an automated pharmacy. More specifically, the present invention is related to a system in a high volume filling center which identifies and verifies the contents of a plurality of containers, e.g., medication containers.

2. Related Art

A high volume pharmacy may process and fill a large number of prescriptions and prescription orders using one or more automated systems. During the processing operation, it is important to verify the contents of a medication container prior to sending that medication container to a customer using a verification system. Such a verification operation may involve the reading of an optical machine readable code, e.g., a bar code. However, some verification systems may have difficulty detecting and reading the machine readable code on some medication containers, thereby slowing throughput in the high volume pharmacy.

SUMMARY OF THE INVENTION AND ADVANTAGES

One aspect of the present disclosure is related to an imaging system for identifying medication containers. The imaging system includes a rotating element that is configured to rotate about a central axis. A plurality of scanners are fixedly attached with the rotating element. Each scanner has a lens that faces generally towards the central axis, and the scanners are spaced apart from one another around the central axis. The scanners are configured to identify an optically readable machine readable code contained on the medication container. An actuator is operably connected with the rotating element and is configured to rotate the rotating element and the scanners around the central axis from respective e first positions to respective second positions to allow the scanners to image different areas of the medication container in response to a failure of the scanners to identify the machine readable code when the scanners were in the respective first positions.

In an example embodiment, the scanners are cameras.

In an example embodiment, the plurality of scanners includes four scanners that are equidistantly spaced apart from one another around the central axis.

In an example embodiment, the actuator is a linear actuator.

In an example embodiment, the respective second positions of the scanners are no greater than thirty degrees (30°) from the respective first positions of the scanners.

In an example embodiment, the scanners are cameras, and the rotating element includes a circular plate and a plurality of camera mount rods that interconnect the cameras with the rotating element.

In an example embodiment, the imaging system further includes a plurality of clamps, and each clamp attaches one of the cameras to one of the camera mount rods.

According to another aspect of the present disclosure, a container handling and verification system is provided. The system includes a container area for storing at least two different types of medication containers, each of the medication containers having an optically readable machine readable code. The system further includes a pick and place mechanism that is configured to engage a first medication container and deliver the first medication container to a location along a central axis of the imaging system. The imaging system includes a plurality of imaging devices that face towards the central axis. The imaging system further includes an actuator that is configured to rotate the imaging devices about the central axis. The imaging devices are configured to perform a first scan on the label of the first medication container with the imaging devices for the machine readable code. In response to the imaging devices not detecting the machine readable code on the label of the first medication container, the image processing system being configured to activate the actuator to rotate the imaging devices about the central axis and perform a second scan on the label of the first medication container.

In an example embodiment, the imaging devices are cameras.

In an example embodiment, the system further includes a controller that is in electrical communication with and controls the pick and place mechanism, the imaging devices, and the actuator upon receiving an order for a medication container.

In an example embodiment, the system further includes a conveyor chute, and the pick and place mechanism is configured to drop the first medication container in a discharge bin in response to either no detection of the machine readable code during both the first and second scans or in response to the machine readable code not matching an expected machine readable code based upon the order received by the controller.

In an example embodiment, the system further includes a label applicator for applying a new label to the first medication container.

According to another aspect of the present disclosure, a method of verifying the contents of a medication container that has an optically readable machine readable code is provided. The method includes the step of holding a medication container in a stationary position such that a plurality of imaging devices are facing the medication container. The method continues with the step of conducting a first visual scan of the medication container with the imaging devices for the machine readable code. The method proceeds with the step of, in response to the imaging devices not detecting the machine readable code, rotating the imaging devices around the medication container and then conducting a second visual scan of the medication container with the imaging devices for the machine readable code with the imaging devices being at a different angle.

In an example embodiment, the method further includes the steps of receiving with a controller an order for a medication container and picking up a first medication container of a plurality of different types of medication containers with the pick and place mechanism.

In an example embodiment, in response to the imaging devices reading the machine readable code during either the first visual scan or the second visual scan, then the method proceeds as follows. If the machine readable code matches an expected machine readable code based on the order, then the method continues with placing the medication container in a first location using the pick and place mechanism. If the machine readable code does not match an expected machine readable code based on the order, then the method continues with placing the medication container in a second location that is different than the first location using the pick and place mechanism.

In an example embodiment, the method further includes the step of applying a label to the medication container prior to placing the medication container in the first location.

In an example embodiment, the first location is a conveyor, and the second location is a discharge bin.

In an example embodiment, the imaging devices are fixedly attached to a rotating element, and an actuator is configured to rotate the rotating element and the cameras.

In an example embodiment, the actuator is a linear actuator.

In an example embodiment, the actuator is pneumatic.

BRIEF DESCRIPTION OF THE DRAWINGS

These and other features and advantages of the invention will become more readily appreciated when considered in connection with the following description of the presently preferred embodiments, appended claims and accompanying drawings, in which:

FIG. 5 is a front elevation view of the imaging system of FIG. 4 and showing a plurality of cameras in respective first positions;

FIG. 6 is another front elevation view of the imaging system of FIG. 4 and showing the plurality of cameras in respective second positions that are different than the first positions shown in FIG. 5;

FIG. 7 is a fragmentary and cross-sectional view of a portion of the imaging system of FIG. 4;

FIG. 8 is a perspective and fragmentary view of a portion of the imaging system of FIG. 4.

DESCRIPTION OF THE ENABLING EMBODIMENT

Figure 1:
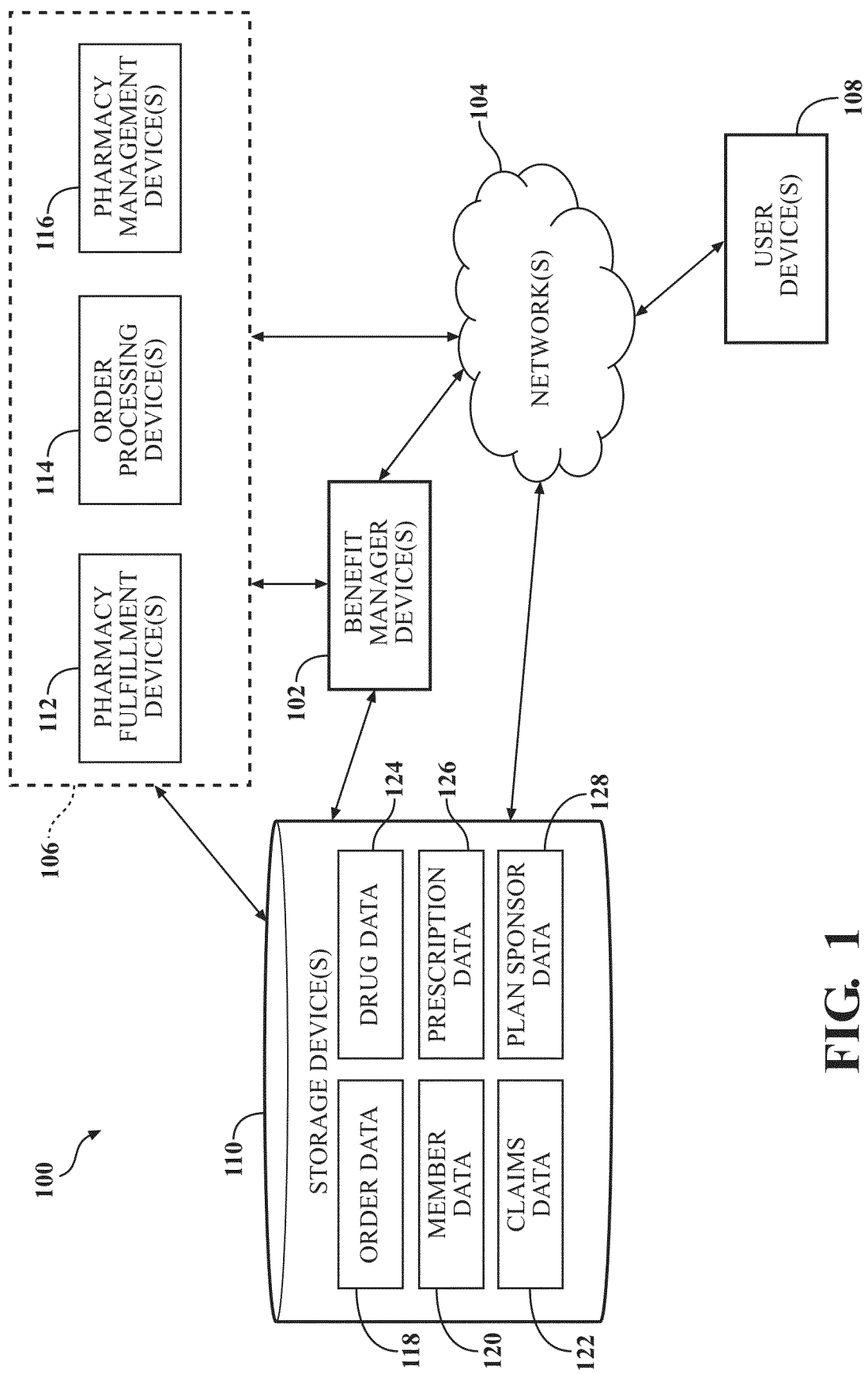
FIG. 1 is a block diagram of an example system according to an example embodiment.

FIG. 1 is a block diagram of an example implementation of a system 100, according to an example embodiment. While the system 100 is generally described as being deployed in a high volume pharmacy or fulfillment center (e.g., a mail order pharmacy, a direct delivery pharmacy, an automated pharmacy, multiple package delivering center, and the like), the system 100 and/or components thereof may otherwise be deployed (e.g., in a lower volume pharmacy). The system 100 can include a fulfillment center that takes a manufacturer's container, relabels the container and uses the relabeled container to fill an order. A high volume pharmacy may be a pharmacy that is capable of filling prescriptions automatically, mechanically, manually, or a combination thereof. The system 100 may include a benefit manager device 102, a pharmacy device 106, and a user device 108, which may communicate with each other directly and/or over a network 104. The system 100 may also include a storage device 110. The system 100 can include a plurality of different containers, e.g., tens of different types of containers, hundreds of different types of containers, or multiples thereof. The different containers in the system 100 can be of different sizes and shapes and labeled with a machine readable code, which can be difficult for the system to read due to the different shapes and sizes of the containers.

The benefit manager 102 is a device operated by an entity that is at least partially responsible for creation and/or management of the pharmacy or drug benefit. While such an entity operating the benefit manager device 102 is typically a pharmacy benefit manager (PBM), other entities may operate the benefit manager device 102 either on behalf of themselves, the PBM, another entity, or other entities. For example, the benefit manager device 102 may be operated by a health plan, a retail pharmacy chain, a drug wholesaler, a data analytics or other type of software-related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy. The pharmaceutical vending machines or kiosks, and the like. The PBM device may track the medications in the containers stored in the system 100. The PBM device may not be able to track the shape of the manufacturer container associated with the materials stored in the container or the location of the machine readable code on the manufacturer container. The materials can be medications or supplements.

Some of the operations of the PBM that operates the benefit manager device 102 may include the following activities and processes. A member (or a person on behalf of the member) of a pharmacy benefit plan administered by or through the PBM attempts to obtain a prescription drug at a retail pharmacy location (e.g., a location of a physical store) from a pharmacist or a pharmacist technician. The member may also attempt to obtain the prescription drug through mail order drug delivery from a mail order pharmacy location, which may be the high volume pharmacy system 100. In some embodiments, the member may also attempt to obtain the prescription drug directly or indirectly through the use of a machine, such as a kiosk, vending unit, mobile electronic device, or a different type of mechanical electrical, electronic communication device, and/or computing device. Such a machine may be filled with the prescription drug in prescription packaging, which may include multiple prescription components, by the high volume pharmacy system 100.

The member may have a copayment for the prescription drug that reflects an amount of money that the member is responsible to pay the pharmacy for the prescription drug. The money paid by the member to the pharmacy may come from personal funds of the member, a health savings account (HAS) of the member or the member's family, a health reimbursement arrangement (HRA) of the member or the member's family, a flexible spending account (FSA) of the member or the member's family, or the like. In some instances, an employer of the member may directly or indirectly fund or reimburse the member for the copayments.

The amount of the co-pay required form the member may vary with different pharmacy benefit plans having different plan sponsors or clients and/or prescription drugs. The member's copayment may be based on a flat copayment (e.g., $10), co-insurance (e.g., 10%), and/or a deductible (e.g., for first $500 of annual prescription drug expenses) for certain prescription drugs, certain types and/or classes of prescription drugs, and/or all prescription drugs. The copayment may be stored in the storage 110 or determined by the benefit manager device 102.

In some instances, the member may not pay the copayment or may only pay a portion of the copayment for the prescription drug. For example, if the usual and customary cost for a generic version of a prescription drug is $4, and the member's flat copayment is $20 for the prescription drug, the member may only be required to pay $4 to receive the prescription drug. In another example involving a worker's compensation claim. No copayment may be due by the member for the prescription drug.

In addition, copayments may also vary based on different delivery channels used for the prescription drug to be received by the member. For example, the copayment for receiving the prescription drug from a mail order pharmacy location may be less than the copayment for receiving the prescription drug from a retail pharmacy location.

In conjunction with receiving the copayment (if any) from the member and dispensing the prescription drug to the member, the pharmacy submits a claim to the PBM for the prescription drug. After receiving the PBM (e.g., through the benefit manager device 102) may perform certain adjudication operations including verifying eligibility of the member, identifying and/or reviewing an applicable formulary for the member to determine any appropriate copayment, coinsurance, and deductible for the prescription drug, and performing a drug utilization review (DUR) on the member. The PBM provides a response to the pharmacy (e.g., from the benefit manager device 102 to the pharmacy device 106) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated.

The aforementioned adjudication operations generally occur before the copayment is received and the prescription drug is dispensed. However, in some instances these operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be determined at least partially based on the type(s) of pharmacy network in which the pharmacy is included. Other factors may also be used to determine the amount in addition to the type of pharmacy network. For example, if the member pays the pharmacy for the prescription drug without the prescription drug benefit provided by the PBM (e.g., by paying cash without use of the prescription drug benefit or by use of a so-called pharmacy discount card offering other negotiated rates), the amount of money paid by the member may be different than when the member uses prescription or drug benefit. In some embodiments, the amount of money received by the pharmacy for dispensing the prescription drug and for the prescription drug itself may be higher than when the member uses the prescription or drug benefit. Some or all of the foregoing operations may be performed by executing instructions stored on the benefit manager device 102 and/or an additional device.

Examples of the network 104 include Mobile Communications (GSM) network, a code division multiple access (CDMA) network, $3^{rd}$ Generation Partnership Project (3GPP), an Internet Protocol (IP) network, a Wireless Application Protocol (WAP) network, a WiFi network, or an IEEE 802.11 standards network, as well as various combinations thereof. The network 104 may include an optical network. The network 104 may be a local area network or a global communication network, such as the Internet. In some embodiments, the network 104 may include a network dedicated to prescription e-orders, e.g., a prescribing network such as the electronic prescribing network operated by Surescripts of Arlington, Va.

Moreover, although the system shows a single network 104, multiple networks can be used. The multiple networks may communicate in series with each other to link the devices 102, 106-110 or in parallel to link the devices 102, 106-110.

The pharmacy device 106 may include an order processing device 114, a pharmacy manager device 116, and a pharmacy fulfillment device 112 in communication with each other directly and/or over the network 104.

The order processing device 114 may receive information regarding filling prescriptions and may direct an order component to one or more than one of the devices of the pharmacy fulfillment device 112 at a pharmacy. The pharmacy fulfillment device 112 may fulfill, dispense, aggregate, and/or pack the order components of the prescription drugs in accordance with one or more than one of the prescription orders directed by the order processing device 114. The order processing device 114 may be deployed in the system 100, or may otherwise be used.

In general, the order processing device 114 is a device located within or otherwise associated with the pharmacy to enable fulfillment of a prescription and dispensing prescription drugs by the pharmacy fulfilment device 112. In some embodiments, the order processing device 114 may be an external device separate from the pharmacy and communicate with other devices located within the pharmacy.

For example, the external order processing device 114 may communicate with an internal order processing device 114 and/or other devices located within the system 100. In some embodiments, the external order processing device 114 may have limited functionality (e.g., as operated by a patient requesting fulfillment of a prescription drug), while the internal pharmacy order processing device 114 may have greater functionality (e.g., as operated by a pharmacist).

The order processing device 114 may track the prescription order as it is fulfilled by the pharmacy fulfillment device 112. The prescription order may include one or more than one prescription drugs to be filled by the pharmacy. The order processing device 114 may make pharmacy routing decisions and/or order consolidation decisions for the particular prescription order. The pharmacy routing decisions may include what device(s) in the pharmacy are responsible for filling or otherwise handling certain portions of the prescription order. The order consolidation decisions include whether portions of one prescription order or multiple prescription orders should be shipped together for a patient or a patient family. The order processing device 114 may also track and/or schedule literature or paperwork associated with each prescription order or multiple prescription orders that are being shipped together.

The pharmacy management device 116 may enable and/or facilitate management and operations in a pharmacy. For example, the pharmacy management device 116 may provide functionality to enable receipt and processing of prescription drug claims, management of pharmacy personnel, management of pharmaceutical and non-pharmaceutical products, track products in the pharmacy, record workplace incidents involve personnel and products, and the like. In some embodiments, the order processing device 114 may operate in combination with the pharmacy management device 116.

In some embodiments, the pharmacy management device 116 may be a device associated with a retail pharmacy location (e.g., exclusive pharmacy location, a grocery store with a retail pharmacy, or a general sales store with a retail pharmacy) or other type of pharmacy location at which a member attempts to obtain a prescription. The pharmacy management device 116 may be utilized by the pharmacy to submit the claim to the PBM (e.g., through the benefit management device 102) for adjudication.

In some embodiments, the pharmacy management device 116 may enable information exchange between the pharmacy and the PBM, for example, to allow the sharing of member information such as drug history, and the like, that may allow the pharmacy to better service a member (e.g., by providing more informed therapy consultation and drug interaction information, etc.). In some embodiments, the benefit manager 102 may track prescription drug fulfillment and/or other information for patients that are not members or have not identified themselves as members, at the time (or in conjunction with the time) in which they seek to have a prescription filled at a pharmacy.

The pharmacy fulfillment devices 112, the order processing device, and/or the pharmacy management device 116 may include circuitry, a processor, a memory to store data and instructions, and communication functionality. The pharmacy management device 116 may include a plurality of processors operatively coupled to memory circuitry to execute instructions stored in memory. These devices 112-116, in some embodiments are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116 may include circuitry, a processor, a memory to store data and instructions, and communication functionality. These devices 112-116, in some embodiments, are dedicated to performing processes, methods and/or instructions described herein. Other types of electronic devices specifically configured to implement with the processes, methods and/or instructions described herein may also be used.

In some embodiments, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (e.g., by utilizing a local storage) and/or through the network 104 (e.g., by utilizing a cloud configuration or software as a service, etc.) with the storage 110.

The user device 108 is used by a device operator. The device operator may be a user (e.g., an employee, a contractor, a benefit member, a patient of the pharmacy, or the like) associated with the system 100. Other device operators may also operate the user device 108. A device operator may include other devices operated by circuitry. In some embodiments, the user device 108 may enable the device operator to attend to pharmacy operations in a convenient manner (e.g., remote from a pharmacy). In some embodiments, the user device 108 may enable the device operator to receive information about pharmacy processes, prescription drug fulfillment status, and the like.

The user device 108 may be a stand-alone device that solely provides at least some of the functionality of the methods and systems, or may be a multi-use device that has functionality outside off analysis of the methods and systems. Examples of the user device 108 include a set-top box (STB), a receiver card, a mobile telephone, a personal digital assistant (PDA), a display device, a portable gaming unit, a computing system, and the like. Other devices, however, may also be used. In some embodiments, the computing system may include a mobile computing device. For example, the user device 108 may include a mobile electronic device, such as an iPhone or iPad by Apple, Inc., and mobile electronic devices powered by Android by Google, Inc. The user device 108 may also include other computing devices, such as desktop computing devices, notebook computing devices, netbook computing devices, gaming devices, and the like. Other types of electronic devices may also be used. These devices include processor circuitry that execute instructions to perform tasks as described herein.

The storage device 110 may include: a non-transitory storage (e.g., memory, hard disk, CD-ROM, and the like) in communication with the benefit manager device 102, the pharmacy device 106, and/or the user device 108 directly and/or over the network 104. The non-transitory storage may store order data 118, member 120, claims data 122, drug data 124, prescription data 126, and/or plan sponsor 128. Further, the system 100 may include additional devices, which may communicate with each other directly or over the network 104.

The order data 118 may be related to a prescription order. The order data may include the type of the prescription drug (e.g., drug name and strength) and quantity of the prescription drug. The order data 118 may also include data used for completion of the prescription, such as prescription materials and/or the type and/or size of container in which the drug is dispensed or in which is requested to be dispensed. In general, prescription materials include an electronic copy of information regarding the prescription drug for inclusion with or otherwise provided (e.g., via email) in conjunction with the fulfilled prescription. The prescription materials may include electronic information regarding drug interaction warnings, recommended usage possible side effects, expiration date, date of prescribing, or the like. The order data 118 may be used by the pharmacy to fulfill a pharmacy order, e.g., using containers that include a machine code on the outside of the container wall.

In some embodiments, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (e.g., a prescription bottle and sealing lid, prescription packaging, and the like) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information, such as bar code data read from pallets, bins, trays, carts, and the like used to facilitate transportation of prescriptions within the pharmacy may also be stored as order data 118.

The member data 120 includes information regarding the members associated with the PBM. The information stored as member data 120 may include personal information, personal health information, protected health information, fitness data, health data, web and mobile app activity, and the like. Examples of the member data 120 include name, address, telephone number, e-mail address, prescription drug history, and the like. The member data 120 may include a plan sponsor identifier that identifies the plan sponsor associated with the member and/or a member identifier that identifies the member to the plan sponsor. The member data 120 may also include, by way of example, dispensation preferences such as type of label, type of cap, message preferences, language preferences, or the like.

The member data 120 may be accessed by various devices in the pharmacy to obtain information utilized for fulfillment and shipping of prescription orders. In some embodiments, an external order processing device 114 operated by or on behalf of a member may have access to at least a portion of the member data 120 for review, verification, or other purposes.

In some embodiments, the member data 120 may include information for persons who are patients of the pharmacy but are not members in a pharmacy benefit plan being provided by the PBM. For example, these patients may obtain drugs directly from the pharmacy, through a private label service offered by the pharmacy, or otherwise. In general, the use of the terms member (e.g., of a prescription drug benefit plan) and patient (e.g., of a pharmacy) may be used interchangeably in this disclosure.

The claims data 122 includes information regarding pharmacy claims adjusted by the PBM under a drug benefit program provided by the PBM for one, or more than one, plan sponsor. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility, and the like. Additional information may be included.

In some embodiments, other types of claims beyond prescription drug claims may be stored in the claims data 122. For example, medical claims, dental claims, wellness claims, or other types of health care-related claims for members may be stored as a portion of the claims data. The claims data 122 can include the data read from the machine readable code on the container.

In some embodiments, the claims data 122 includes claims that identify the members with whom the claims are associated. In some embodiments, the claims data 122 includes claims that have been de-identified (e.g., associated with a unique identifier but not with a particular, identifiable member), aggregated, and/or otherwise processed.

The drug data 124 may include drug name (e.g., technical name and/or common name), other names by which the drug is known by, active ingredients, an image of the drug (e.g., in pill form), and the like. The drug data 124 may include information associated with a single medication or multiple medications. The drug data 124 can be information that is confirmed using the data read from the machine readable code on the container.

The prescription data 126 may include information regarding prescriptions that may be issued by prescribers on behalf of patients, who may be members of the pharmacy benefit plan, for example to be filled by a pharmacy. Examples of the prescription data 126 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, and the like.

Figure 2:
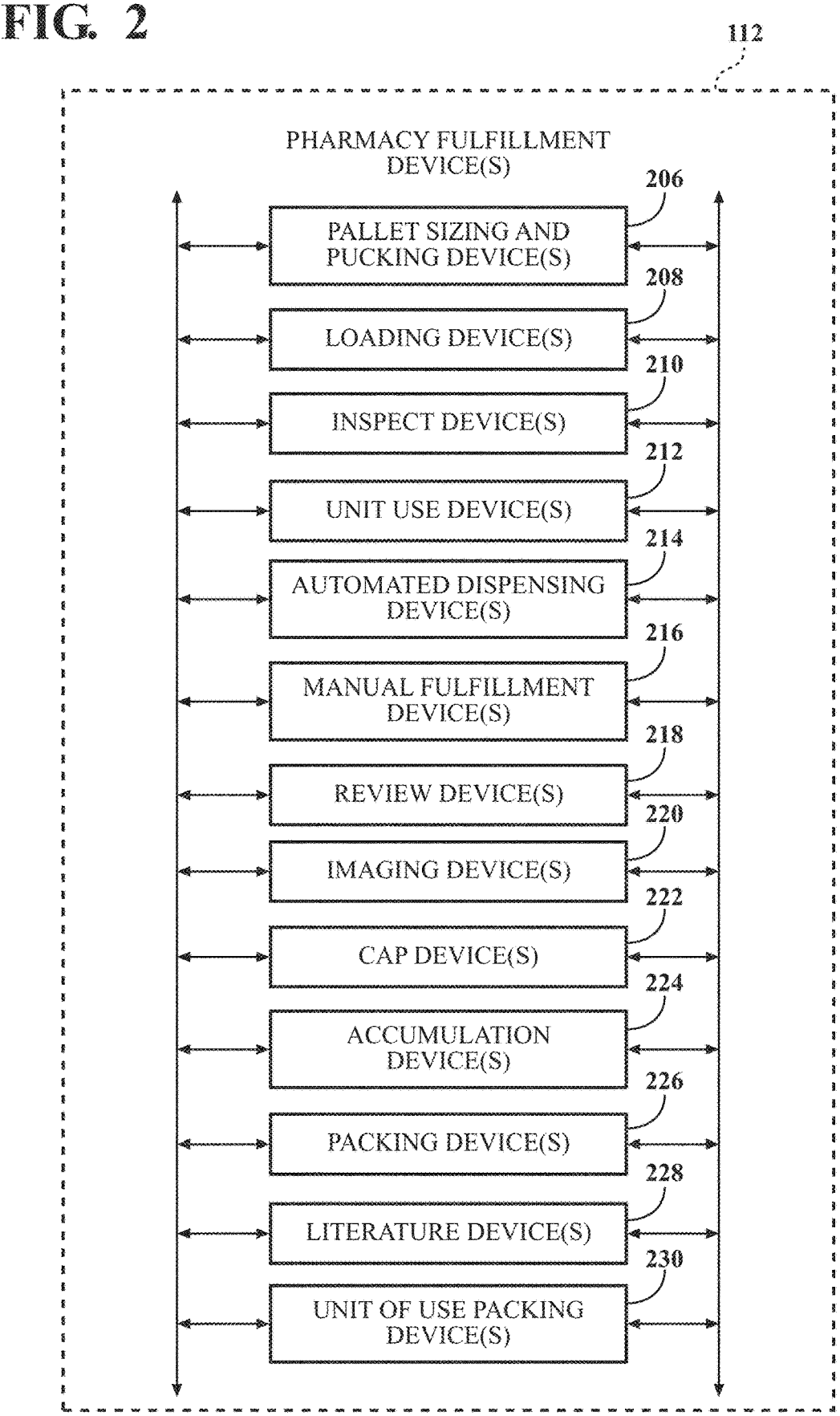
FIG. 2 is a block diagram of an example order processing device that may be deployed within the system of FIG. 1.

FIG. 2 illustrates the pharmacy fulfillment device 112, according to an example embodiment. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device, the order processing device 114, and/or the non-transitory storage 110, directly or over the network 104. Specifically, the pharmacy fulfillment device 112 may include pallet sizing and pucking device(s); loading device(s) 208; inspect device(s) 210, unit of use device(s) 212, automated dispensing device(s) 214, manual fulfillment device(s) 214, review device(s) 218, imaging device(s) 220, cap device(s) 222, accumulation device(s) 224, literature device(s) 228, packing device(s) 226, and unit of use packing device(s) 230. Further, the pharmacy fulfillment device 112 may include additional devices, which may communicate with each other directly or over the network 104.

In some embodiments, operations performed by one or more of these devices 206-230 may be performed sequentially, or in parallel with the operations of devices as may be coordinated by the order processing device 114. In some embodiments, the order processing device 114 tracks a prescription with the pharmacy based on operations performed by one or more than one of the devices 206-230.

In some embodiments, the pharmacy fulfillment device 112 may transport prescription drug containers, for example, between more than one of the devices 206-230 in a high volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism, or the like. In one embodiment, the loading device 208 has robotic arms or pickers to grasp a prescription container and move it to and from a pallet or to and from a puck. The loading device may also print a label that is appropriate for a container that is to be loaded onto the pallet and apply the label to the container. The pallet may be located on a conveyor assembly during these operations (e.g., at the high volume fulfillment center or the like).

The inspect device 210 may verify that containers in a pallet are correctly labeled and in the correct spot on the pallet. The inspect device 210 may scan the label on one or more than one container on the pallet. Labels of containers may be scanned or imaged in full or in part by the inspect device 210. Such imaging may occur after the container has been lifted out of its puck by a robotic arm, picker, or the like, or may be otherwise scanned or imaged while retained in the puck. In some embodiments, images and/or video captured by the inspect device may be stored in the storage device as a portion of the order data 118.

The unit of use device 212 may temporarily store, monitor, label, and/or dispense unit of use products. In general, unit of use products are prescription drug products that may be delivered to a patient or member without being repackaged at the pharmacy. These products may include pills in a container, pills in a blister pack, inhalers, liquids in a spray or other dispensing container, and the like. Prescription drug products dispensed by the unit of use device 212 may be packaged individually or collectively for shipping, or may be shipped in combination with other prescription drugs dispensed by other devices (e.g., in the high volume fulfillment center). The unit of use products may include manufacturers containers.

At least some of the operations of the devices 206-230 may be directed by the other processing device 114. For example, the manual fulfillment device 216, the review device 218, the automated dispensing device 214, the packing device 226, and/or another device may receive instructions provided by the order processing device.

The automated dispensing device 214 may include one or more than one device that dispenses prescription drugs or pharmaceuticals into prescription containers in accordance with one or multiple prescription orders. In general, the automated dispensing device 214 may include mechanical and electronic components with, in some embodiments, software and/or logic to facilitate pharmaceutical dispensing that would otherwise be performed in a manual fashion by a pharmacist and/or pharmacist technician. For example, the automated dispensing device 214 may include high volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high volume fulfillment center.

The manual fulfillment device 216 may provide for manual fulfillment of prescriptions. For example, the manual fulfillment device 216 may receive or obtain a container and enable fulfillment of the container by a pharmacist or pharmacy technician. In some embodiments, the manual fulfillment device 216 provides the filled container to another device in the pharmacy fulfillment devices 112 to be joined with other containers in a prescription order for a patient or member. In general, a manual fulfillment may include operations at least partially performed by a pharmacist or a pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter or the like). Prescription drugs dispensed by the manual fulfillment device 216 may be packaged individually or collectively for shipping or may be shipped in combination with other prescription drugs dispensed by other devices in the high volume fulfillment center.

The review device 218 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review may be performed at the manual station.

The imaging device 220 may image containers prior to filling and/or after they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114, and/or stored in the storage device 110 as part of the order data 118.

The cap device 222 may be used to cap or otherwise seal a prescription container. In some embodiments, the cap device 222 may secure a prescription container with a type of cap in accordance with a patient preference (e.g., a preference regarding child resistance, a preference regarding built-in adherence functionality, or the like), a plan sponsor preference, a prescriber preference, or the like. The cap device 222 may also etch a message into the cap or otherwise associate a message into the cap, although this process may be performed by a different device in the high volume fulfillment center.

The accumulation device 224 accumulates various containers of prescription devices in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218, at the high volume fulfillment center. The accumulation device 224 may be used to group the prescription containers prior to shipment to the member or otherwise.

The literature device 228 prints, or otherwise generates, literature to include with prescription drug orders. The literature may be printed on multiple sheets of substrates, such as paper, coated paper, printable polymers, or combinations thereof. The literature printed by the literature device 228 may include information required to accompany the prescription drugs included in a prescription order, relating to prescription drugs in the order, financial information associated with the order (e.g., an invoice or an account statement, or the like).

In some embodiments, the literature device 228 folds or otherwise prepares the literature for inclusion with a prescription drug order (e.g., in a shipping container or the like). In some embodiments, the literature device 228 that prints the literature may be separate from the literature device that prepares the literature for inclusion with a prescription order. The packing device 226 packages a prescription order in preparation for shipping the order. The packing device 226 may box, bag, or otherwise package the fulfilled prescription order for delivery. The packing device 226 may be a wrap seal device. A wrap seal device deployed as the packing device 226 may be a wrap seal device. A wrap seal device deployed as the packing device 226 may pause before an index; during the pause, one or more bottle, envelope or literature items have been placed within a vacuum pocket of the wrap seal device. After any bottle, envelope, or literature items have been placed in the pocket, the wrap seal device may index; specifically, the vacuum pocket may move forward. In an example embodiment, the forward movement is about the length of a bag (for example, between about 16 and 20 inches).

The packing device 226 may further place inserts (e.g., literature or other papers) into the packaging received from the literature device 228 or otherwise. For example, bulk prescription orders may be shipped in a box, while other prescription orders may be shipped in a bag which may be a wrap seal bag. The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, sort by zip code, or the like). The packing device 226 may include ice or temperature sensitive elements for prescriptions which are to be kept within a temperature range during shipping in order to retain efficacy or otherwise. The ultimate package may then be shipped through postal mail, through a mail order delivery service that ships via ground and/or air (e.g., UPS®, FedEx®, or DHL®, or the like), through delivery service, through a local delivery service (e.g., a courier service), through a locker box at a shipping site (e.g., an Amazon® locker, library locker, a post office box, or the like) or otherwise.

The unit of use packing device 230 packages a unit of use prescription order in preparation for shipping the order.

The pharmacy fulfillment device 112 in FIG. 2 may include single devices 206-230 or multiple devices 206-230 (e.g., depending upon implementation in a pharmacy). The devices 206-230 may be the same type or model of device or may be different device types or models. When multiple devices are present, the multiple devices may be of the same device type or models or may be a different device type or model. The types of devices 206-230 shown in FIG. 2 are example devices. In other configurations of the system 100, lesser, additional, or different types of devices may be included.

Moreover, multiple devices may share processing and/or memory resources. The devices 206-230 may be located in the same area or in different locations. For example, the devices 206-230 may be located in a building or a set of adjoining buildings. The devices 206-230 may be interconnected (e.g., by conveyors), networked, and/or otherwise in contact with one another or integrated with one another (e.g., at the high volume fulfillment center). In addition, the functionality of a device may be split among a number of discrete devices and/or combined with other devices.

Figure 3:
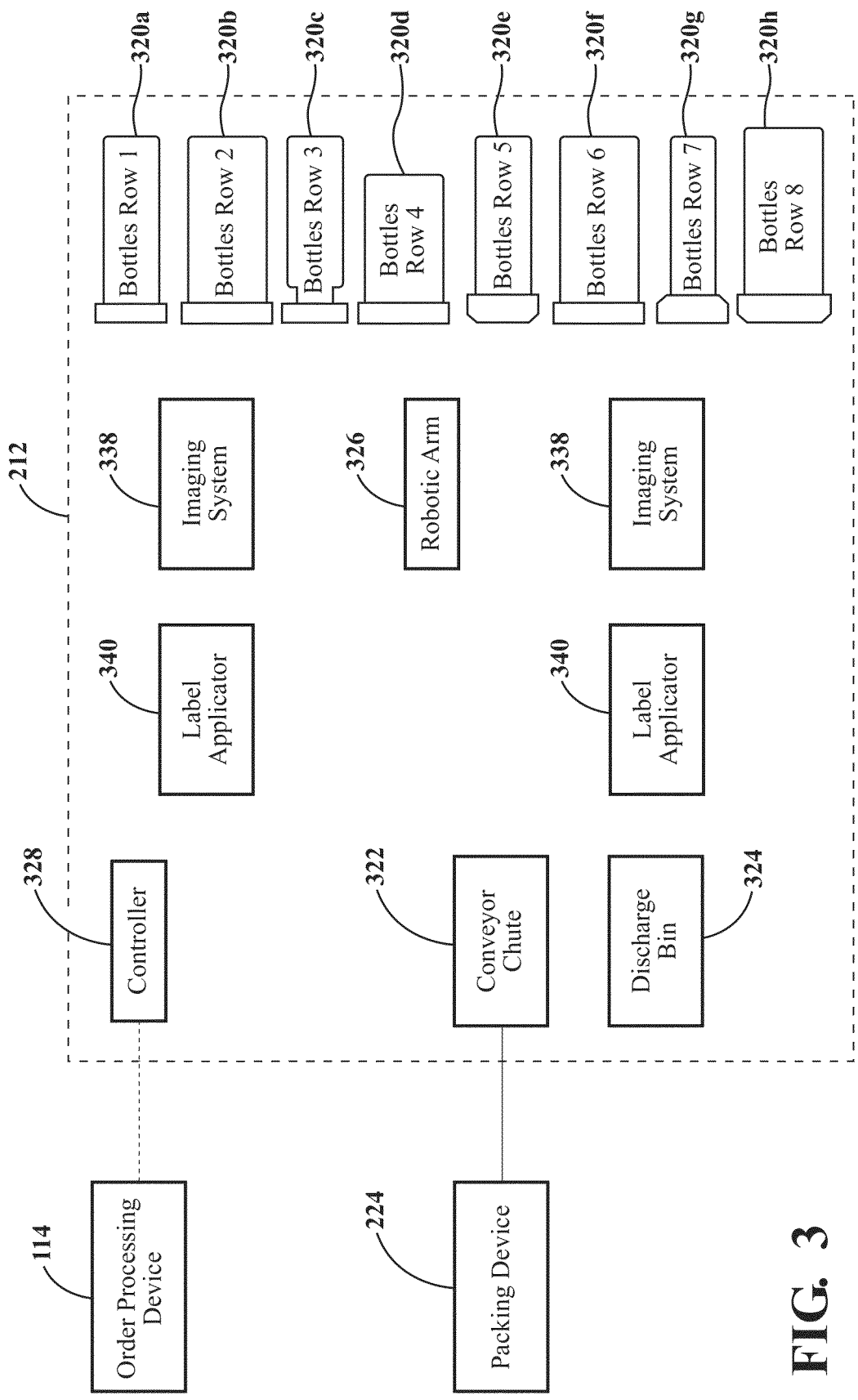
FIG. 3 is a block diagram of an example unit of use device that may be deployed in the order processing device of FIG. 2.

FIG. 3 is a schematic view illustrating an exemplary embodiment of the unit of use device 212 for storing, monitoring, and labeling prepackaged prescription drug containers, namely, prepackaged medication bottles 320. In an example embodiment, the unit of use device 212 can operate on manufacturer containers. As discussed in further detail below, in operation, the unit of use device 212 receives instructions from the order processing device 114. Upon receipt of instructions, the unit of use device 212 handles and verifies the contents a medication bottle 320 and delivers the bottle 320 to the packing device 224 via a conveyor chute 322. Alternately, if the unit of use device 212 cannot verify the contents of the bottle 320 or the contents of the bottle 320 does not match the instructions from the order processing device 114, then the unit of use device 212 delivers the bottle to a discharge bin 324. The bottles 320 may contain any suitable types of medications including, for example, liquid medications, pills, capsules, etc.

The medication bottles 320a-h in the bottle area are arranged in a plurality of rows with each row containing a plurality of identical bottles and with at least some of the different rows containing different types of bottles 320a-h and/or similar bottles with different contents. For example, the bottles 320a-h in the different rows may have different shapes (e.g., a cylindrical shape or a rectangular parallelepiped shape) and/or sizes from one another. In an embodiment, the bottles 30a-h can range in size from one to nine inches (1-9 in) in diameter or width. In an embodiment, the rows are angled downwardly in a direction towards a robotic arm 326 (discussed in further detail below) so that when a bottle 320a-h is removed from the bottle area by the robotic arm 328, the other bottles 320a-h automatically slide downward towards the robotic arm 326 such that a next bottle 320a-h is in a ready to pick position for the robotic arm 326. The bottles 320a-h can thus be restocked into the various rows from an opposite side of the bottle area from the robotic arm 326. This allows the bottle area to be restocked (either automatically or manually) without interrupting the operation of the robotic arm 326 or the other components of the unit of use device 212. The bottles 320a-h can be labeled with a machine readable code, which can be positioned differently from container to container of a same type or be positioned differently on different types of containers. Moreover, the bottles 320a-h can be of different dimensions, e.g., outer perimeter, circumference or the like, such that the machine code extends around a different percentage of the outer dimension of the bottle.

Figure 4A:
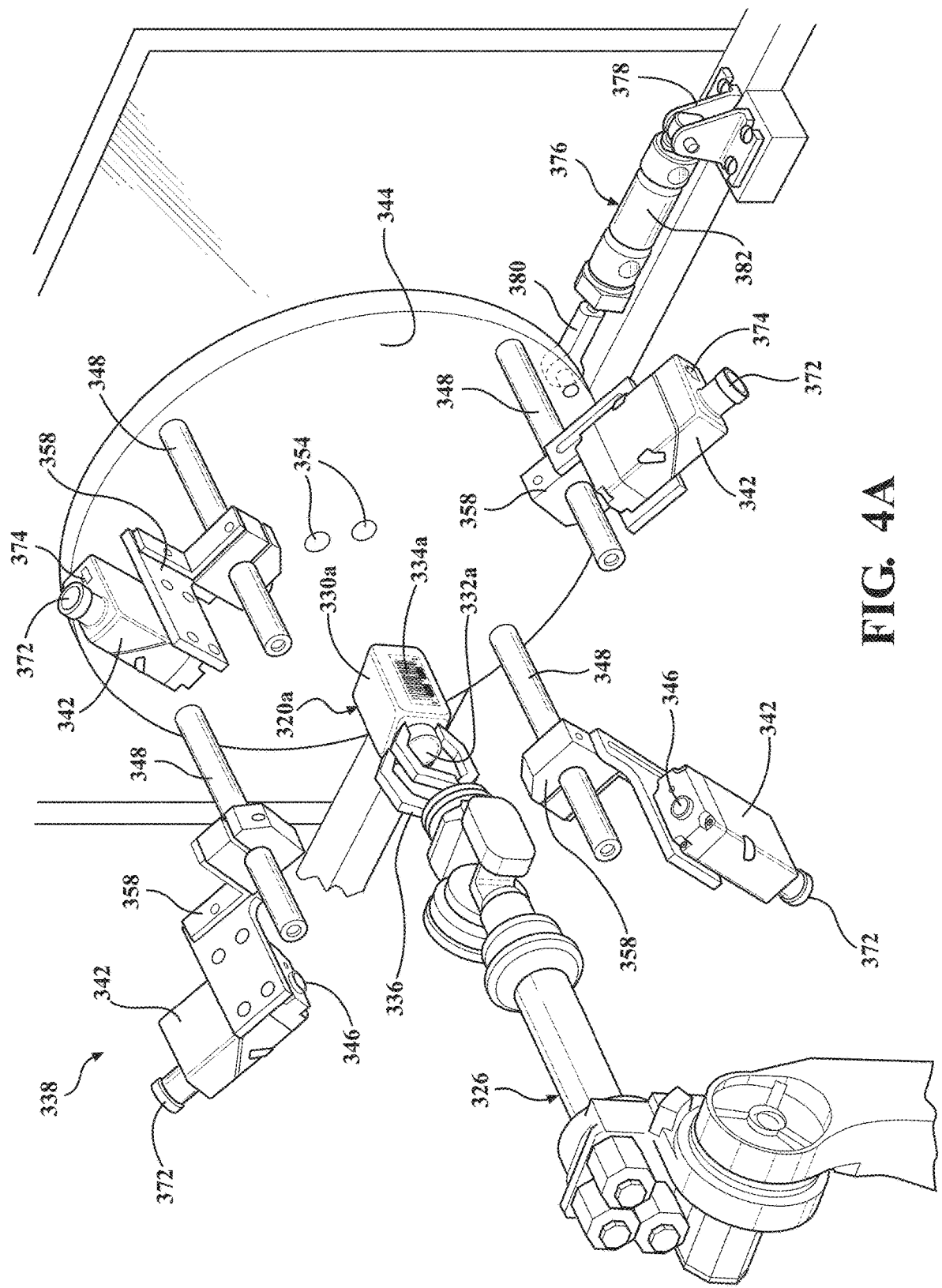
FIG. 4A is a perspective view of an exemplary embodiment of an imaging system that may be employed in the unit of use device of FIG. 3.
Figure 4B:
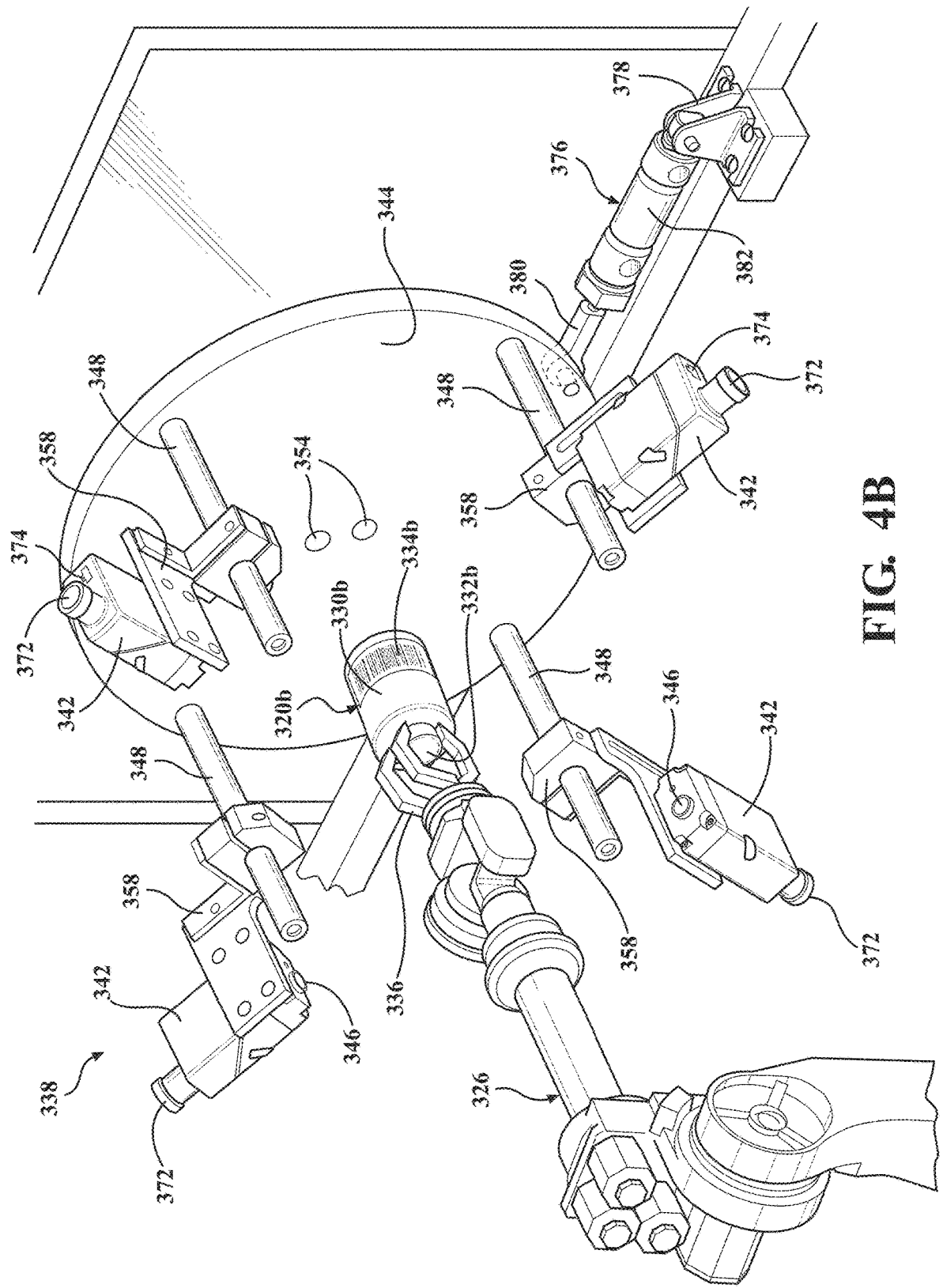
FIG. 4B is another perspective view of the exemplary embodiment of the imaging system and showing the imaging system engaging a different bottle than is shown in FIG. 4A.

As shown in FIGS. 4A and 4B, each bottle 320*a*, 320*b* has a cup portion 330*a*, 330*b* and a removable cap 332*a*, 332*b*. A first label 334*a*, 334*b*, which contains an optical machine-readable code, is adhered to the cup portion 330*a*, 330*b* prior to the bottle 320*a*, 320*b* being stocked into the bottle area. In the exemplary embodiment, the machine readable codes are barcodes. However, it should be appreciated that Quick Read (QR) codes or any suitable types of machine readable codes which can be read with an optical sensor, such as a camera, could alternately be employed. The machine readable code contains information on the contents of the bottle 320*a*, 320*b*, e.g., the type and quantity of the medication contained in the bottle 320*a*, 320*b*. In an example embodiment, the machine readable code is a bar code, numerical code or the like.

Referring back to FIG. 3, the unit of use device 212 includes a controller 328 which electronically receives the instructions from the order processing device 114. In operation, the controller 328 instructs the robotic arm 326 (or another pick and place mechanism) on which one of the bottles 320*a-h* in the bottle area to pick up and where to deliver it.

Referring now to both FIGS. 3 and 4, in the exemplary embodiment, the robotic arm 326 is a six-axis robotic arm 326 that has a gripping mechanism 336 which is able to releasably engage with the caps 332 of the bottles 320 in the bottle area and lift the bottles by the caps 332. Once the bottle 320 has been lifted, the robotic arm 326 is configured to the bottle 320 to one of two imaging systems 338. As discussed in further detail below, each imaging system 338 is configured to read the machine readable code on the first label 334 to verify the bottle which has been picked by the robotic arm 326 matches the instructions received by the controller 328. In the exemplary embodiment, the unit of use device 212 includes two similarly constructed imaging systems so that the robotic arm 326 can bring the picked up bottle 320 to whichever imaging system is nearest. Thus, in the arrangement shown in FIG. 3, bottles 320*a-d* will all be brought to one imaging system 338 and bottles 320*e-h* will all be brought to the other imaging system 338. This configuration saves time by reducing the distance that any given bottle 320 has to travel from the bottle area to the imaging system 338 and allows the unit of use device 212 to operate more quickly. In other embodiments, the unit of use device 212 has only a single imaging system 338 or three or more imaging systems 338.

Adjacent each of the imaging systems 338, the unit of use device 212 includes a label applicator 340. When the imaging system 338 confirms that the contents of a bottle 320 matches the contents which was ordered by the order processing device 114, the label applicator prints out a new second label, and the robotic arm 326 moves the bottle 320 from the imaging system 338 to the label applicator 340 to apply the second label over the first label 334. The second label may include, for example, a patient's name, the type of medication contained in the bottle 320, the quantity of medication contained in the bottle 320, prescription instructions, an expiration date, etc.

Referring now to FIGS. 3, 4A, and 4B, in the exemplary embodiment, each imaging system 338 includes a camera system which includes a plurality of cameras 342 that can each identify the optical machine-readable code. In other embodiments, the imaging system 338 may contain barcode scanners or the like. The cameras 342 are all mounted in such a way that they are spaced apart from one another and face towards a central axis A so that when one of the bottles 320*a*, 320*b* brought by the robotic arm 326 into a space along the central axis A, the cameras 342 can scan for the machine readable code on the first label 334*a*, 334*b*. If any one of the cameras 342 is able to detect and read the machine readable code, then a signal is sent from the imaging system 338 to the controller 328. The controller 328 compares the bottle 320*a*, 320*b* to the bottle that was requested by the order processing device 114. The cameras 342 may be in electronic communication with a memory (not shown) which can electronically store any images taken by the cameras 342 during operation of the unit of use device 212. In some cases (such as FIG. 4B), more than one of the cameras 342 may combine to detect and read the machine readable code.

If none of the cameras 342 is able to detect and read the machine readable code on the first label 334*a*, 334*b*, then the imaging system 338 is able to reorient the cameras 342 to scan the bottle 320*a*, 320*b* from different vantage points. To reorient the cameras 342, in the exemplary embodiment, the imaging system 338 includes a rotational element in the form of a rotating plate 344 which is circular in shape around the central axis A. The rotating plate 344 supports the cameras 342 in such a manner that the lenses 346 of all of the cameras 342 all face towards the central axis A. The rotating plate 344 is preferably made out of a rigid material, e.g., a metal, such as steel, a steel alloy, or an aluminum alloy. However, any suitable material may be employed. In other embodiments, the rotating plate 344 has a non-circular shape.

A plurality of cylindrically shaped camera mount rods 348 are equally spaced apart from one another and are fixedly attached with the rotating plate 344 adjacent an outer perimeter of the rotating plate 344. In the exemplary embodiment, fasteners (such as bolts) extend through the main plate 344 and engage the camera mount rods 348 to fixedly attach these components together. In other embodiments, the camera mount rods 348 are fixedly attached with the rotating plate 344 via other attachment means, such as welding.

The camera mount rods 348 all extend in parallel relationship with one another and with the central axis A. As shown in FIG. 7, the rotating plate 344 is fixedly attached with a rotation shaft 350 which is itself supported by a bearing 352 to allow the rotating plate 344 to rotate and adjust the positions of the cameras 342 around the central axis A. The rotation shaft 350 has a first end face which is fixedly attached with one side face of the rotating plate 344 along the central axis A via a pair of fasteners 354 which extend through the rotating plate 344 and are in a threaded engagement with a pair of threaded blind holes formed into the rotation shaft 350.

The rotation shaft 350 extends along the central axis A through the bearing 352 to a second end face on an opposite side of the bearing 352 from the rotating plate 344. The rotation shaft 350 has a retaining ring groove which receives a retaining ring 356 adjacent the second end face for holding the rotation shaft 350 on the bearing 352. A pair of flanged bushings are partially inserted into a radial gap between an outer surface of the rotation shaft 350 and an inner race of the bearing 352.

The bearing 352 is supported by a bearing mount 357 that is attached with a fixed surface, such as a wall. In the exemplary embodiment, the bearing 352 is a roller bearing. However, other types of bearings may alternately be employed, including ball bearings.

Referring now to FIG. 8, each camera 342 is fixedly attached with an end of its respective camera mount rod 348 via a mounting fixture 358 which includes a base plate 360, an L-bracket 362, and a clamp 364. A plurality of fasteners extend through the base plate 360 to threadedly engage with the camera 342 and thereby fixedly attach the camera 342 with the base plate 360. The L-bracket 362 has a first leg that is fixedly attached with the base plate 360 and a second leg that is fixedly attached with the clamp 364. The clamp 364 has an opening which receives the respective camera mount rod 348. The clamp 364 further includes a slot 366 which extends from a side of the clamp 364 to the opening. A clamp fastener 368, such as a set screw, extends across the slot 366 and is threadedly engaged with the clamp 364 for tightening the clamp 364 onto the respective camera mount rod 348. This configuration of the mounting fixture 348 allows both the axial location and the orientation of the camera along the camera mount rod 348 to be precisely chosen and adjusted by simply loosening the clamp fastener 368, making the necessary adjustments, and re-tightening the clamp fastener 368.

Referring back to FIGS. 4A and 4B, each camera 342 has a lens 346 which faces towards the central axis for viewing the bottle 320 that is being held stationary by the robotic arm 326. Each camera 342 also has a light source 370 (shown in FIG. 8), which is preferably a light emitting diode (LED), that is directed generally towards the central axis, i.e., in the same direction as the lens 346. On an opposite side of the camera 342 from the lens 346 and the light source 370, each camera 342 has a power port 372 which receives a power cord (not shown) and an communication port 374 which receives a communication cord (not shown) which enables the camera 342 to communicate with the controller 328 (shown in FIG. 3). In an example, the communication port includes an ethernet port, serial port or the like to receive a communication cord. In other embodiments, the camera 342 may be powered by an internal power source, such as a battery, and may communicate with the controller 328 through other communication means which may be either wired (e.g., bus) or wireless (e.g., Bluetooth, NFC, WiFi, cellular, or the like.

The imaging system 338 further includes an actuator 376 for rotating the rotating plate 344, along with the cameras 342, around the central axis and any bottle 320 being held stationary in the imaging system 338 by the robotic arm 326 to give the cameras 342 different vantage points on the bottle 320 if none of the cameras 342 are able to initially find and/or read the machine readable code after a first scan is completed. That is, the bottle 320 is held radially inwardly from the camera lenses within the field of view of at least cameras but not in contact with cameras or plate. A robotic arm extends toward the plate to place the bottle in the field of view of the cameras. The cameras are pointed inwardly generally toward the rotational axis of the plate. However, the robotic arm and the bottle do not mechanically contact the plate, cameras or the camera brackets. The actuator 376 is pivotably mounted to an actuator bracket 378 and has an actuator rod 380 and a housing 382, and activation of the actuator 376 by the controller 328 causes the actuator rod 380 to extend into or out of the housing 382. An end of the actuator rod 380 has a pivotable eye hole, and a fastener extends through an opening in the rotating plate 344 and through the eye hole to operably attach the rotating plate 344 with the actuator 376. Thus, activation of the actuator 376 causes the rotating plate 344 and the cameras 342 to rotate about the central axis from respective first positions (shown in FIG. 5) to respective second positions (shown in FIG. 6). When the actuator rod 380 travels in one direction (into or out of the housing 382), the rotating plate 344 and cameras 342 rotate in one direction (clockwise or counter-clockwise), and when the actuator rod 380 travels in an opposite direction (into or out of the housing 382), the rotating plate 344 and cameras 342 rotate in an opposite direction (clockwise or counter-clockwise).

In the exemplary embodiment, the actuator 376 is configured such that the rotation from the first positions to the second positions is approximately thirty degrees (30°). In other embodiments, the first and second positions may be either greater or less than thirty degrees (30°) from one another. In the exemplary embodiment, the actuator 376 is a pneumatic linear actuator. In other embodiments, the actuator 376 may be hydraulically or electrically powered and may be non-linear.

Figure 9:
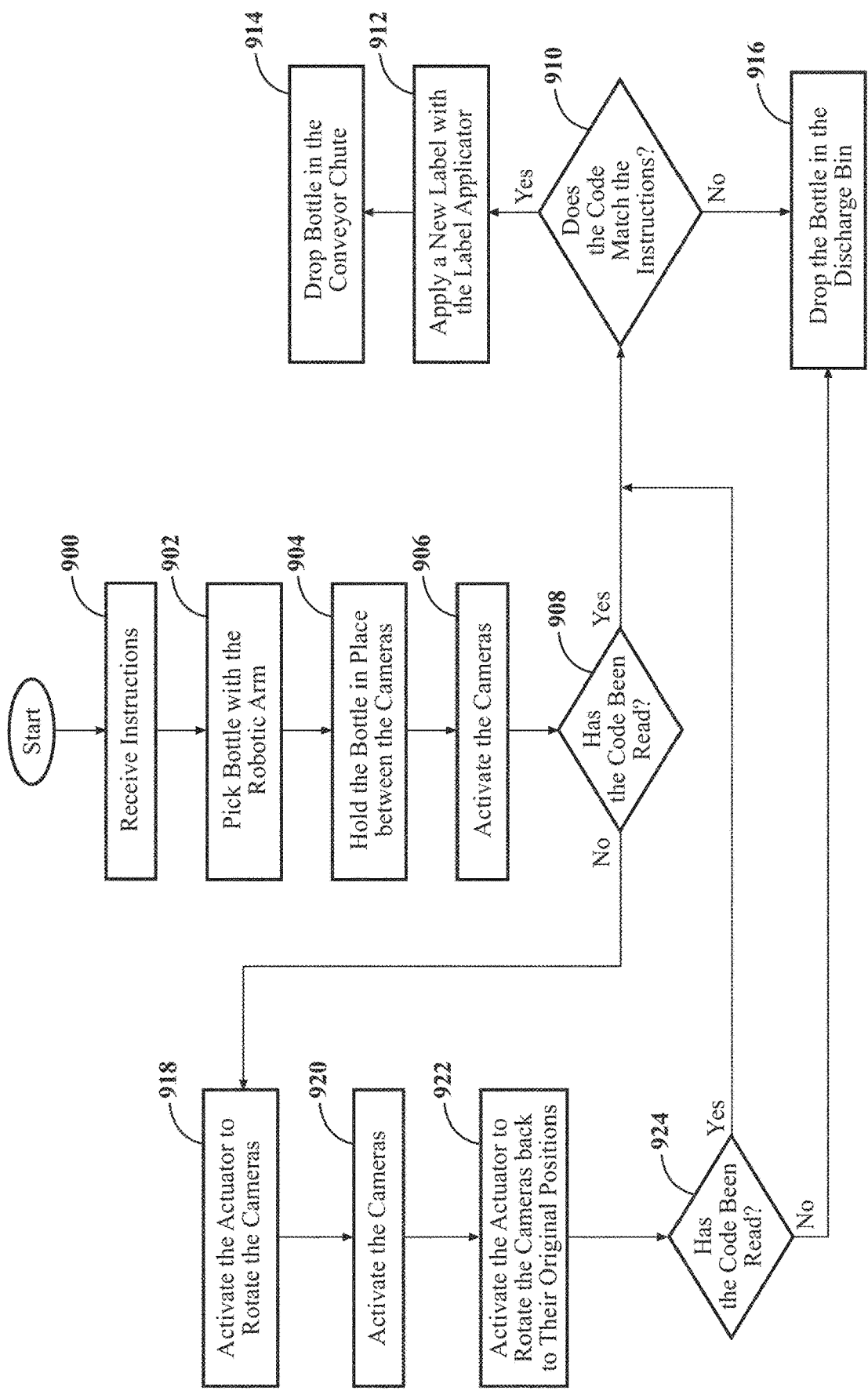
FIG. 9 is a flow chart illustrating a method according to one aspect of the subject invention.

Operation of the unit of use device 212 is as follows with reference to the flow chart of FIG. 9 and the structure shown in FIGS. 3-8. At step 900, instructions are received by the controller 328 from the order processing device 114. At step 902, the controller 328 processes the instruction and directs the robotic arm 326 to pick up a specific type of bottle 320a-h from the bottle area according to the instructions and transport the bottle 320 to the imaging system 338, which can be the nearest imaging system. At step 904, the robotic arm 326 holds the bottle 320 in a position along the central axis and between the cameras 342. In an example embodiment, the robotic arm 326 holds the cap end of the bottle 320 with the closed bottom end adjacent the plate 344 while not mechanically contacting the cameras or the plate 344. At step 906, the controller 328 then temporarily activates the cameras 342 to perform a first scan for the machine readable code on the bottle 320. At decision step 908, the controller 328 determines whether the machine readable code was successfully found and read from any of the images taken by the cameras 342.

If the answer at step 908 is yes, then the process proceeds to decision step 910. At step 910, the controller 328 determines whether the machine readable code is the correct machine readable code which aligns with the instructions received from the order processing device 114 in step 900. If the answer to step 910 is yes, then at step 912, the robotic arm 328 carries the bottle 320 to the label applicator 340, which automatically prints and applies a new, second label to the bottle 320 on top of the first label 334. Next, at step 914, the robotic arm 326 drops the bottle 320 into the conveyor chute 322, which carries the bottle 320 to the packing device 226.

If the answer to step 910 is no, then at step 916, the robotic arm 326 drops the bottle 320 into the discharge bin 324.

If the answer to step 908 is no, then the process proceeds to step 918. At step 918, the controller 328 activates the actuator 376 to rotate the rotating plate 344 and the cameras 342 around the central axis from respective first positions (shown in FIG. 5) to respective second positions (shown in FIG. 6). In the second positions, the cameras 342 have different vantage points than they did in their respective first positions. Thus, in many cases where the machine readable code was not in the vantage fields any of the cameras 342 when the cameras were in the first positions, it may now be in the vantage field of one of the cameras 342 in the second positions. At step 920, the cameras 342 are temporarily re-activated to perform a second scan of the bottle 320 for the machine readable code. At step 922, the controller 328 activates the actuator 376 to rotate the rotating plate 344 and the cameras 342 in an opposite direction from step 918 back to their respective first positions.

The process then proceeds to decision step 924. At step 924, the controller 328 determines whether the machine readable code was successfully read from the images taken by the cameras 342 during the second scan. If the answer to step 924 is yes, then the method proceeds to aforementioned decision step 910. If the answer to step 924 is no, then the process proceeds to aforementioned step 916.

In an example embodiment, the machine readable code extends around the bottle such that the code is not readable by a single camera. At least a portion of the machine readable code extends around the container onto another wall of the container such that a single camera cannot read the machine readable code. In an example, the machine readable code disappears over the horizon in the image taken by the camera.

In an example embodiment, the cameras have a field of view in the horizontal direction and the vertical direction. The plate turns to rotate the cameras if the entire machine readable code is not in the field of view of a single camera cannot read the machine readable code. In another example embodiment, the robotic arm rotates the bottle in a direction counter to the rotation of the plate.

In an example embodiment, the robotic arm holds the container co-linear with the rotational axis of the plate and/or the cameras. In other embodiment, the robotic arm holds the container within the field of views of the cameras but is not positioned co-linear with the rotational axis.

The present disclosure uses the term bottle and the term container. A container can be an object to store or transport contents. A bottle is also an object to store content, which can have a narrower neck. These terms can be used in the present described systems and processes as both can store pharmaceuticals, medicines, supplements and the like. In the present system, the bottles and containers store contents that should be verified using the cameras as described herein. A container can be used in the embodiments that describe a bottle and vise versa.

Obviously, many modifications and variations of the present invention are possible in light of the above teachings and may be practiced otherwise than as specifically described while within the scope of the appended claims. Additionally, it is to be understood that all features of all claims and all embodiments can be combined with each other as long as they do not contradict each other.

What is claimed is:

1. An imaging system for identifying medication containers, comprising:
    a rotating element which is configured to rotate about a central axis;
    a plurality of scanners fixedly attached to said rotating element, said scanners each having a lens which faces generally towards said central axis, and said scanners being spaced apart from one another around said central axis;
    said scanners being configured to identify an optically readable machine readable code contained on a medication container; and
    an actuator operably connected with said rotating element and being configured to rotate said rotating element and said scanners around said central axis from respective first positions to respective second positions to allow said scanners to image different areas of the medication container in response to a failure of said scanners to identify the machine readable code when said scanners were in said respective first positions.

2. The imaging system as set forth in claim 1, wherein said scanners are cameras.

3. The imaging system as set forth in claim 1, wherein said plurality of scanners includes four scanners which are equidistantly spaced apart from one another around said central axis.

4. The imaging system as set forth in claim 1, wherein said actuator is a linear actuator.

5. The imaging system as set forth in claim 1 wherein said respective second positions of said scanners are no greater than thirty degrees (30°) from said respective first positions of said scanners.

6. The imaging system as set forth in claim 1, wherein said scanners are cameras, and wherein said rotating element includes a circular plate and a plurality of camera mount rods which interconnect said cameras to said rotating element.

7. The imaging system as set forth in claim 6, further including a plurality of clamps and wherein each clamp attaches one of said cameras to one of said camera mount rods.

8. A container handling and verification system, comprising:
    a container area for storing at least two different types of medication containers, the medication containers having an optically readable machine readable code;
    a pick and place mechanism configured to engage a first medication container and deliver the first medication container to a location along a central axis of an imaging system;
    said imaging system including a plurality of imaging devices which face towards said central axis, and said imaging system including an actuator which is configured to rotate said imaging devices about said central axis;
    said imaging devices being configured to perform a first scan on the label of the first medication container with said imaging devices for said machine readable code; and
    in response to said imaging devices not detecting said machine readable code on said label of said first medication container, said image processing system being configured to activate said actuator to rotate said imaging devices about said central axis and perform a second scan on said label of said first medication container.

9. The container handling and verification system as set forth in claim 8, wherein said imaging devices are cameras.

10. The container handling and verification system as set forth in claim 8, further including a controller which is in electrical communication with said pick and place mechanism and said imaging devices and said actuator and which controls said pick and place mechanism, said imaging devices, and said actuator upon receiving of an order for a medication container.

11. The container handling and verification system as set forth in claim 8 further including a conveyor chute and wherein said pick and place mechanism is configured to drop said first medication container in a discharge bin in response to either no detection of said machine readable code during both said first and second scans or in response to said machine readable code not matching an expected machine readable code based upon the order received by said controller.

12. The container handling and verification system as set forth in claim 8, further including a label applicator for applying a new label to said first medication container.

13. A method of verifying contents of a medication container which has an optically readable machine readable code, comprising the steps of:
  holding the medication container in a stationary position such that a plurality of imaging devices are facing the medication container;
  conducting a first visual scan of the medication container with the imaging devices for the machine readable code; and
  in response to the imaging devices not detecting the machine readable code, rotating the imaging devices around the medication container and then conducting a second visual scan of the medication container with the imaging devices for the machine readable code with the imaging devices being at a different angle.

14. The method as set forth in claim 13, further comprising the steps of:
  receiving with a controller an order for a medication container; and
  picking up a first medication container of a plurality of different types of medication containers with a pick and place mechanism.

15. The method as set forth in claim 14, further comprising the step of:
  in response to one of the imaging devices reading the machine readable code during either the first visual scan or the second visual scan, then;
    if the machine readable code matches an expected machine readable code based on the order, placing the medication container in a first location using the pick and place mechanism, and
    if the machine readable code does not match an expected machine readable code based on the order, placing the medication container in a second location that is different than the first location using the pick and place mechanism.

16. The method as set forth in claim 15, further including the step of applying a label to the medication container prior to placing the medication container in the first location.

17. The method as set forth in claim 15, wherein the first location is a conveyor and wherein the second location is a discharge bin.

18. The method as set forth in claim 13, wherein the imaging devices are fixedly attached to a rotating element and further including an actuator which is configured to rotate the rotating element and the cameras.

19. The method as set forth in claim 18, the actuator is a linear actuator.

20. The method as set forth in claim 19, wherein the actuator is pneumatic.

* * * * *